(12) United States Patent
Duvall et al.

(10) Patent No.: US 7,664,712 B1
(45) Date of Patent: Feb. 16, 2010

(54) METHOD AND SYSTEM FOR IMPACT ANALYSIS USING A DATA MODEL

(75) Inventors: Clayton Duvall, Austin, TX (US); Eric Maginniss, Round Rock, TX (US); Brandon Stewart, Austin, TX (US)

(73) Assignee: Troux Technologies, Austin, TX (US)

( * ) Notice: Subject to any disclaimer, the term of this patent is extended or adjusted under 35 U.S.C. 154(b) by 469 days.

(21) Appl. No.: 11/198,649

(22) Filed: Aug. 5, 2005

(51) Int. Cl.
*G06F 15/18* (2006.01)

(52) U.S. Cl. ...................... 706/1; 700/30; 707/1; 707/6

(58) Field of Classification Search ........................ None
See application file for complete search history.

(56) References Cited

U.S. PATENT DOCUMENTS

| | | | |
|---|---|---|---|
| 5,572,732 A | 11/1996 | Fant et al. | |
| 6,226,792 B1 | 5/2001 | Goiffon et al. | |
| 6,442,557 B1 | 8/2002 | Buteau et al. | |
| 6,509,898 B2 | 1/2003 | Chi et al. | |
| 6,529,909 B1 | 3/2003 | Bowman-Amuah | |
| 6,611,838 B1 | 8/2003 | Ignat et al. | |
| 6,662,188 B1 | 12/2003 | Rasmussen et al. | |
| 7,103,171 B1 | 9/2006 | Annadata et al. | |
| 7,124,180 B1 | 10/2006 | Ranous | |
| 7,428,546 B2 | 9/2008 | Nori et al. | |
| 2003/0110253 A1 | 6/2003 | Anuszczyk | |
| 2003/0177481 A1* | 9/2003 | Amaru et al. | 717/148 |
| 2003/0208367 A1 | 11/2003 | Aizenbud-Reshef et al. | |
| 2003/0212640 A1 | 11/2003 | Andresen | |
| 2004/0002818 A1 | 1/2004 | Kulp | |
| 2004/0049509 A1 | 3/2004 | Keller | |
| 2004/0073655 A1 | 4/2004 | Kan | |
| 2004/0111513 A1 | 6/2004 | Shen | |
| 2004/0225791 A1 | 11/2004 | Keskar | |
| 2005/0033762 A1 | 2/2005 | Kasravi | |
| 2005/0138039 A1 | 6/2005 | Hagen | |
| 2005/0203920 A1* | 9/2005 | Deng et al. | 707/100 |
| 2006/0106796 A1* | 5/2006 | Venkataraman et al. | 707/6 |

(Continued)

OTHER PUBLICATIONS

Office Action issued in U.S. Appl. No. 10/803,133 dated Oct. 4, 2006.

(Continued)

*Primary Examiner*—David R Vincent
*Assistant Examiner*—Kalpana Bharadwaj
(74) *Attorney, Agent, or Firm*—Sprinkle IP Law Group

(57) ABSTRACT

Systems and methods for determining the impact of an asset on an enterprise architecture using a data model are disclosed. These systems and methods may determine the impact of a particular asset on the enterprise architecture represented by the data model, where determination of the impact of any particular asset takes into account not only assets that depend directly on that particular asset, but assets that depend indirectly on that asset as well. Using the data model of the enterprise architecture, dependency chains for one or more components of the data model can be discovered and a dependency map created. Using impact ratings associated with relationships between components in the dependency chains of a particular component, the impact of that particular component both on another individual component, and aggregately on an environment, can be determined. These systems and methods may also allow the determination of the risk of a particular component.

20 Claims, 15 Drawing Sheets

U.S. PATENT DOCUMENTS

2006/0136437 A1 6/2006 Yamasaki
2006/0167927 A1 7/2006 Edelstein
2006/0195460 A1 8/2006 Nori
2006/0277022 A1 12/2006 Pulfer
2006/0294148 A1 12/2006 Brunet
2007/0192415 A1 8/2007 Pak

OTHER PUBLICATIONS

Office Action issued in U.S. Appl. No. 10/803,133 dated May 17, 2007.
Office Action issued in U.S. Appl. No. 10/803,133 dated Nov. 2, 2007.
Office Action issued in U.S. Appl. No. 10/802,304 dated Jan. 9, 2008.
Office Action issued in U.S. Appl. No. 10/802,304 dated Jun. 30, 2008.
Office Action issued in U.S. Appl. No. 10/803,133 dated May 28, 2008.
Office Action issued in U.S. Appl. No. 10/802,178 dated Aug. 19, 2008.
Office Action issued in U.S. Appl. No. 11/095,323 dated Mar. 3, 2008.
Office Action issued in U.S. Appl. No. 11/095,323 dated Aug. 10, 2007.
Office Action issued in U.S. Appl. No. 11/095,323 dated Aug. 20, 2008.
Office Action issued in U.S. Appl. No. 11/117,039 issued Aug. 20, 2008.
Office Action issued in U.S. Appl. No. 10/802,178 issued Mar. 3, 2008.
Office Action issued in U.S. Appl. No. 10/802,178 issued Sep. 5, 2007.
Office Action issued in U.S. Appl. No. 10/802,304 issued Jun. 18, 2007.
Muller, Robert, "Database Design for Smarties Using UML for Data Modeling", Morgan Kaufmann Publishers, 265 pages, 1999.
Office Action issued in U.S. Appl. No. 10/803,133 issued Oct. 7, 2008.
U.S. Patent and Trademark Office, Office Action issued in U.S. Appl. No. 11/117,039 mailed Feb. 12, 2009, Eric Maginniss, 27 pages.
U.S. Patent and Trademark Office, Office Action issued in U.S. Appl. No. 11/095,323 mailed Feb. 17, 2009, William C. Cason Jr., 14 pages.
U.S. Patent and Trademark Office, Office Action issued in U.S. Appl. No. 10/802,304, mailed Feb. 17, 2009, Clint Miller, 12 pages.
Gomik, "UML Data Modeling Profile", 2002, Rational corp., TP162, pp. i-ii, 1- 11.
CBOP et al., "A UML Profile for Enterprise Distributed Object Computing - Joint Final Submission - Component Collaboration Archicatures (CCA)", OMG Document No. ad/Aug. 19, 2001, http://enterprisecomponent.com/docs/EdocCCA.pdf, 169 pages.

* cited by examiner

TABLE 1290

|  | First Level Dependencies | Impact Rating |
|---|---|---|
| Component 990 | Component 960 | 4 |
|  | Component 970 | 4 |
|  | Component 980 | 4 |

1301

| Dependency Map of Data Model ||
|---|---|
| Dependency Chain | Impact Rating |
|  |  |
| Component 930 => Component 960 | 5 |
| Component 930 => Component 960 => Component 990 | 5,4=4 |
| Component 910 => Component 930 => Component 960 | 3,5=3 |
| Component 910 => Component 930 => Component 960 => Component 990 | 3,5,4=3 |
|  |  |
|  |  |

1302

| Dependency Map of Data Model | |
|---|---|
| Dependency Chain | Impact Rating |
| | |
| Component 940=>Component 970 | 5 |
| Component 940=>Component 970=>Component 990 | 5,4=4 |
| Component 910—>Component 940—>Component 970 | 3,5=3 |
| Component 910=>Component 940=>Component 970=>Component 990 | 3,5,4=3 |
| | |
| | |

| Dependency Map of Data Model | |
|---|---|
| Dependency Chain | Impact Rating |
| | |
| | |
| | |
| Component 920=>Component 940=>Component 970 | 3,5=3 |
| Component 920=>Component 940=>Component 970=>Component 990 | 3,5,4=3 |
| | |
| | |

| Dependency Map of Data Model | |
|---|---|
| Dependency Chain | Impact Rating |
| | |
| Component 950 => Component 980 | 5 |
| Component 950 => Component 980 => Component 990 | 5,4=4 |
| Component 920 => Component 950 => Component 980 | 3,5=3 |
| Component 920 => Component 950 => Component 980 => Component 990 | 3,5,4=3 |
| | |
| | |

| Dependency Map of Data Model | |
|---|---|
| Dependency Chain | Impact Rating |
| | |
| Component 910 => Component 930 | 3 |
| Component 910 => Component 940 | 3 |
| Component 920 => Component 940 | 3 |
| Component 920 => Component 950 | 3 |
| | |
| | |

| Dependency Chains Generated ||
| Dependency Chain | Impact Rating |
| --- | --- |
| Component 960 => Component 990 | 4 |
| Component 930 => Component 960 | 5 |
| Component 910 => Component 930 | 3 |
| Component 930 => Component 960 => Component 990 | 5,4=4 |
| Component 910 => Component 930 => Component 960 => Component 990 | 3,5,4=3 |
| Component 910 => Component 930 => Component 960 | 3,5=3 |
| 1410 | |

| Dependency Map of Data Model ||
| Dependency Chain | Impact Rating |
| --- | --- |
| Component 970 => Component 990 | 4 |
| Component 940 => Component 970 | 5 |
| Component 910 => Component 940 | 3 |
| Component 940 => Component 970 => Component 990 | 5,4=4 |
| Component 910 => Component 940 => Component 970 => Component 990 | 3,5,4=3 |
| Component 910 => Component 940 => Component 970 | 3,5=3 |
| | |

| Dependency Map of Data Model ||
| --- | --- |
| Dependency Chain | Impact Rating |
|  |  |
| Component 920 = >Component 940 = >Component 970 | 3,5 = 3 |
| Component 920 = >Component 940 | 3 |
| Component 920 = >Component 940 = >Component 970 = >Component 990 | 3,5,4 = 3 |
|  |  |
|  |  |
|  |  |

| Dependency Map of Data Model ||
| --- | --- |
| Dependency Chain | Impact Rating |
| Component 980 = >Component 990 | 4 |
| Component 950 = >Component 980 | 5 |
| Component 920 = >Component 950 | 3 |
| Component 950 = >Component 980 = >Component 990 | 5,4 = 4 |
| Component 920 = >Component 950 = >Component 980 = >Component 990 | 3,5,4 = 3 |
| Component 920 = >Component 950 = >Component 980 | 3,5 = 3 |
|  |  |

*FIG. 14D*

Calculation of Overall Impact Rating of Component 970

| Dependency Chain | Corresponding Asset Chain | Impact Ratings In Chain | Impact Rating of Chain |
|---|---|---|---|
| Component 940==> Component 970 | Application Server==>Server | 5 | 5 |
| Component 920==> Component 940==> Component 970 | PeopleSoft Database==>Application Server==>Server | 3,5 | 3 |
| Component 910==> Component 940==> Component 970 | SAP Database==>Application Server==>Server | 3,5 | 3 |
| | | Total of Impact Ratings = | 11 |
| Total of Impact Rating / Number of Dependency Chains = Overall Impact Rating For Component 970 = 1 1/3 = 3.66 Impact Rating | | | |

1610 brackets the first three rows.

*FIG. 16*

| | Calculation of Impact Rating Between Component 920 and Component 970 | | |
|---|---|---|---|
| Dependency Chain | Corresponding Asset Chain | Impact Ratings In Chain | Impact Rating of Chain |
| Component 920==><br>Component 950==><br>Component 980==><br>Component 990 | PeopleSoft Database==>Application Server==>Server==>Data Center | 3,5,4 | 3 |
| Component 920==><br>Component 940==><br>Component 970==><br>Component 990 | PeopleSoft Database==>Application Server==>Server==>Data Center | 3,5,4 | 3 |
| | | | |
| | | | |
| | | | |
| | | | |
| Impact Rating of dependency Between Component 920 and Component 970 = Lesser of Impact Ratings of All Dependency Chains between Component 920 and Component 970 = 3 | | |

*FIG. 17*

METHOD AND SYSTEM FOR IMPACT ANALYSIS USING A DATA MODEL

TECHNICAL FIELD OF THE INVENTION

The invention relates in general to data modeling, and more particularly, to analyzing an environment using a data model.

BACKGROUND OF THE INVENTION

The world is comprised of a wide and varied assortment of environments and subsystems. Akin to the proverbial butterfly flapping its wings in China and causing a hurricane over Texas, miniscule changes to one part of an environment may have catastrophic ripple effects in a distant part of the same environment. To anticipate these effects, it is helpful to study the ramifications of a change before it occurs, and to study these ramifications it is useful to create a model of the environment. This model can then be used to discover the consequences of a change, and the combinatorial effects of multiple alterations to the environment. Additional benefits of such a model are rationalization of the technology portfolio, and assessment and management of various regulatory and business continuity risks.

However, because of the varied nature of their composition, many types of environments do not lend themselves to modeling. A microcosm of this problem occurs in many enterprise architectures. These enterprise architectures may be intended to have a wide variety of uses: disseminating information about goods and services offered through a site on the World Wide Web, achieving objectives related to a business concern, providing a programming infrastructure for development of software, or keeping track of sales and sales force information.

Consequently, these enterprise architectures grow organically, sewn together in a Frankenstinian manner from a variety of heterogeneous machines and applications. Predicting the effects of business initiatives process and organization, the interaction of application, infrastructure and data organization within an IT environment etc. on these enterprise architecture is almost an exercise in futility without some sort of model. However, modeling these types of enterprise architectures is a daunting prospect.

Typically, there are two approaches to creating models for these enterprise architectures. The first is to create a diagram or a spreadsheet based inventory of the items of interest. This approach is problematic, creating these models requires an in depth evaluation of an enterprise architecture and manual creation of the documents, and whole document retention systems must be kept in place to version and store the documents associated with these types of models. Additionally, changes to the enterprise architecture wreak havoc on these models. The effects from these changes must be manually traced through each of the diagrams, which are not only particularly prone to errors, but time consuming as well. Other problems with storing these models in documents include that there may be a large number of users who need to be able to access and modify these documents, and documents of this type don't lend themselves to concurrent modification, and that it is very difficult to cross-reference information across these documents.

The second approach, equally problematic, is to store items of interest within an enterprise architecture in a relational database. Models created with these relational database tables, however, are particularly susceptible to changes in the enterprise architecture itself. Adding layers, applications, dependencies, projects, geographical locations etc. to an enterprise architecture may require changes to the table schema implementing the model, which may in turn may entail revising all the SQL statements used to implement the database.

A microcosm of these problems occurs with respect to determining the importance of a particular asset to the environment. The importance of an asset within an enterprise architecture may go beyond the direct functionality of that asset. In many cases, the importance of an asset depends on the number of other assets that, in turn, depend on that asset. In other words, the importance of an asset relates directly to the impact that removal or downtime of that asset would have on the enterprise architecture should that asset be removed or no longer available. More specifically, the removal of a particular asset may cause ripples of changes which propagate to portions of the enterprise architecture not directly dependent or related to that particular asset.

Typically, solutions to determining the impact of an asset in an environment do not take into account these multiple direct, and indirect, dependencies. Prior solutions to calculating the impact of an asset utilized standard financial tools, such as spread sheets or other tabular recording or calculating means. These solutions are incapable of accounting for the complex interdependencies between assets of a large enterprise architecture. Additionally, these solutions are limited to a single-level dependency and could not formulate an analysis which reflected the impact the removal of a particular asset would aggregately have on an environment.

As can be seen, a need exists for methods and systems for a data model which can model an arbitrarily complex enterprise architecture, and which is easily extensible to allow the representation of any desired logical or physical entity and the associations and dependencies between these entities. Furthermore, a need exists for methods and systems which can use these data models to determine the impact of an asset within the modeled enterprise architecture.

SUMMARY OF THE INVENTION

Systems and methods for determining the impact of an asset on an enterprise architecture using a data model are disclosed. These systems and methods may determine the impact of a particular asset on the enterprise architecture represented by the data model, where determination of the impact of any particular asset takes into account not only assets that depend directly on that particular asset, but assets that depend indirectly on that asset as well. Using the data model of the enterprise architecture, dependency chains for one or more components of the data model can be discovered and a dependency map created. Using impact ratings associated with relationships between components in the dependency chains of a particular component, the impact of that particular component both on another individual component, and aggregately on an environment, can be determined. These systems and methods may also allow the determination of the risk of a particular component.

In one embodiment, a set of dependency chains between a first component and a second component in a data model is calculated, an impact rating for each of these dependency chains is determined and an impact rating between two components determined.

In another embodiment, the impact rating between the two components is determined by selecting the lesser of each of the impact ratings of each of the dependency chains.

In yet another embodiment, a set of dependency chains ending in a component in a data model is calculated, an impact rating for each of these dependency chains is determined and an overall impact rating for the component is calculated.

Embodiments of the present invention provide the technical advantage that the calculation of the impact of a component can be determined taking into account the overall impact that the asset may have on the enterprise architecture as a whole. These other assets may be both real and virtual assets which depend on the asset. Furthermore, the present invention can take into account cyclical dependencies within a dependency chain of an asset, in one embodiment by ignoring such cyclical relationships.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 10 includes a flow diagram for one embodiment of determining the impact of an asset.

FIG. 12 includes a representation of one embodiment of tables representing first degree dependencies of the components of the data model of FIG. 9.

FIGS. 13A-E includes a representation of one embodiment of a set of dependency chains and impact ratings of the dependency chains.

FIGS. 14A-D includes a representation of one embodiment of a dependency map.

FIG. 16 includes a representation of one embodiment of the determination of an overall impact rating for a component.

FIG. 17 includes a representation of one embodiment of the determination of an impact rating between components.

DETAILED DESCRIPTION

Figure 1:
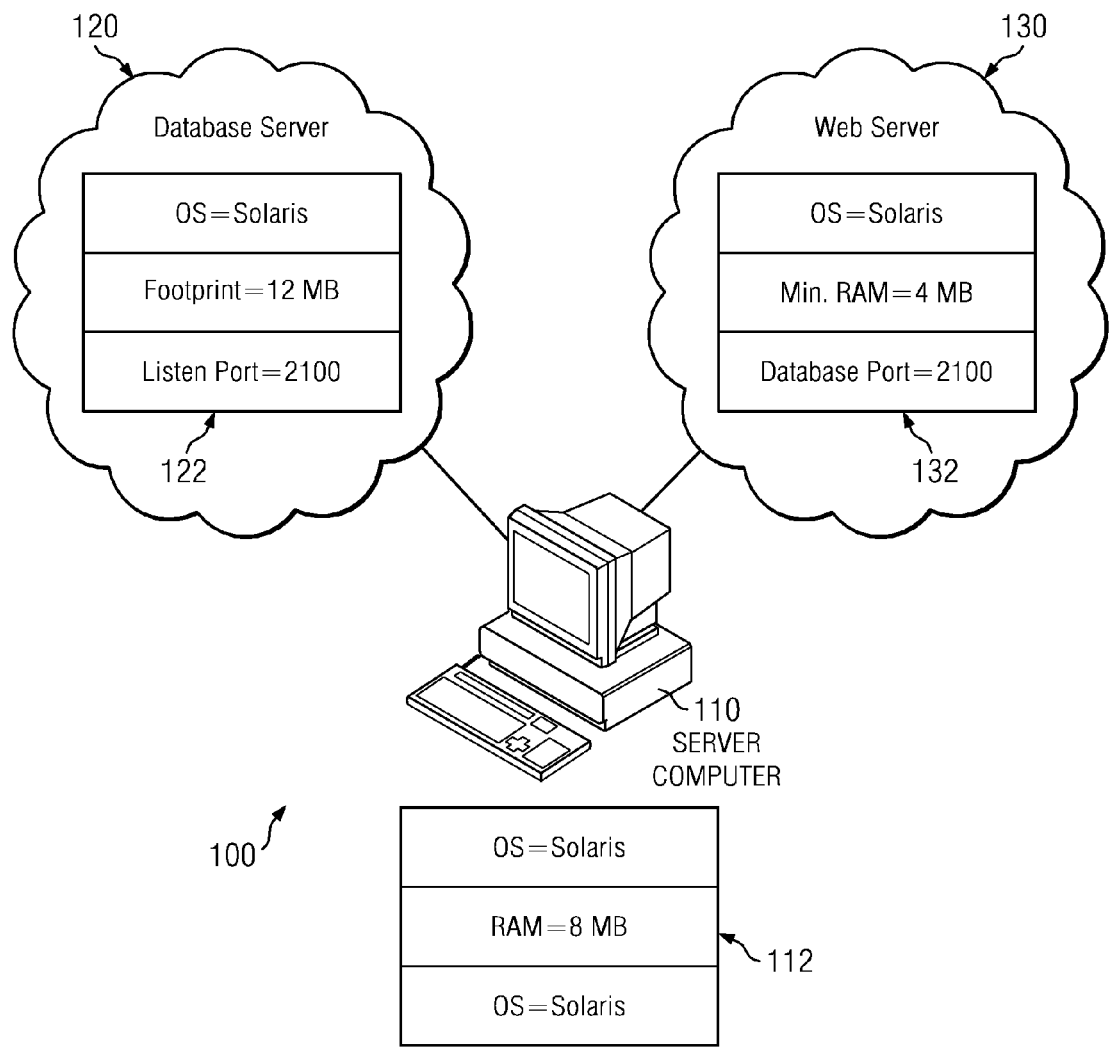
FIG. 1 includes an illustration of a simple IT environment.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. The term "component" is intended to mean a representation of any definable, logical or physical entity or asset. A component may have a group of properties. In an IT environment, an entity or asset may be any portion of the environment desired to be represented, including hardware, such as a server or database, applications which may reside on one or more actual machines, virtual data repositories, firmware and the like. Many levels of abstraction are possible. For example, a network may be represented as a component, a subnetwork of that network may be represented as a component, a server on the subnetwork may also be represented as a component, an application running across that server and other servers may also be represented as a component, a table within that application may be represented as a component, etc.

The term "relationship" is intended to mean a representation of an association or dependency between two or more components. This association may be based on the property values of the components.

The term "set", when used as in "a set of" is intended to mean a collection of one or more elements.

The term "asset" is intended to mean any conceptual, logical or physical entity within an environment.

The term "check" is intended to mean a determination whether a relationship is valid, or a determination regarding the value or validity of a property of a component. Checks may be associated with components or relationships. In some cases a check is a piece of software which may be associated with a relationship or component. A check may have an output event, such as an email or notification.

The term "property" is intended to mean a characteristic associated with a component or a relationship. This property may have a name and a value associated with it, and components of the same type may have different values for the same property.

The term "type" is intended to mean a category of a relationship or a component. All relationships or components of the same type will have the same properties, though each instance of a component or a relationship may have different values for those properties. For example, a component type named "ComputerType" may be defined, having the properties of "RAM" and "OSType". Each instance of component type "ComputerType" will have the properties "RAM" and "OSType", however in one instance the value of "RAM" may be 4 megabytes, while in another instance the value of "RAM" may be 8 megabytes.

The term "data model" is intended to mean a model for representing anything in the physical world, coupled with logic pertaining to that representation.

The term "reference model" is a structure or taxonomy of component types, relationship types, the cardinality constraints of those relationships or property types for use in modeling a particular environment to which the reference data model pertains.

The term "impact" when used in reference to a component and a data model is intended to mean an effect or possible effect.

The term "subtype" is intended to mean a specialization of a particular type of component or relationship. For example, a component type "computer" may be defined with certain properties. A more specialized version of the "computer" type may be represented as a subtype of "computer" called "server computer". The subtype "server computer" will inherit all the properties of its parent type "computer". A subtype is also a type; consequently subtypes may themselves be parents of subtypes.

The term "enterprise architecture" is intended to mean the elements of an enterprise, the design of these elements, their relationships and how they support the objectives of that enterprise.

The term "first level dependency" is used to indicate two components of which one component, the dependor component, depends directly on another component, the dependee component. A terminal first level dependency is used to refer to a first level dependency in which the dependee component does not depend on any other component. An originating first level dependency is used to refer to a first level dependency in which no other component depends on the dependor component.

The term "dependency chain" is used to indicate a set of components including a beginning component and ending component and a set of relationships, wherein the set of relationships indicate that the beginning component is directly or indirectly dependent on the ending component.

Before discussing embodiments of the present invention, a non-limiting, simple IT environment used in depicting embodiments and examples is briefly described. After reading this specification, skilled artisans will appreciate that many other more complicated environments may be utilized with embodiments of the present invention.

FIG. 1 includes a diagram of a simple IT environment 100. IT environment 100 includes a server computer 110. Server computer 110 may comprise a central processing unit ("CPU"), a read-only memory ("ROM"), a random access memory ("RAM"), a hard drive ("HD") or storage memory, and I/Os. I/Os can include a keyboard, monitor, printer, electronic pointing device (e.g., mouse, trackball, stylus, etc.), or the like. Server computer 110 may also be executing an operating system as is commonly known in the art. Server computer 110 may have a set of attributes 112, such as the type of operating system executing on server computer 110, amount of RAM, amount of free storage space and the like.

IT environment 100 may further contain database server application 120 and web server application 130. Database server application 120 and web server application 130 may have certain attributes 122, 132 which pertain to their particular implementation. For example, each may utilize certain storage resources, have a certain filesystem structure, require a certain operating environment, and have a certain footprint. Other attributes will be readily apparent to those of ordinary skill in the art. Each of these software applications 120, 130 may be executing on server computer 110. Additionally each of the computers in FIG. 1 may have more than one CPU, ROM, RAM, HD, I/O, or other hardware components. Note that FIG. 1 is a simplification of an exemplary hardware configuration. Many other alternative hardware configurations are possible and known to skilled artisans.

Attention is now directed to methods and systems for calculating the level of dependency between assets in an enterprise architecture which takes into account the level of dependency on other assets in the dependency chain. These systems and methods may utilize a reference model composed of a logically structured taxonomy of component types, relationship types and property types with which to create a data model. An enterprise architecture may then be modeled utilizing component types, components, relationship types, relationships and properties based on this reference data model. The data model of the enterprise architecture may then be used to create a dependency map for one or more of the components within the data model, taking into account the dependency chain of the component. Utilizing the impact rating of various relationships in this dependency chain, the level of dependency between two components in the dependency chain may be calculated. Though various simple example environments will be used to demonstrate the power and flexibility of these systems and methods, after reading this disclosure it will be apparent to those of ordinary skill in the art that theses types of systems and methods for calculating the level of dependency between components may be utilized with any arbitrarily complex enterprise architecture, and for that matter any arbitrarily complex real world system.

In an illustrative embodiment of the invention, the computer-executable instructions may be lines of assembly code or compiled $C^{++}$, Java, or other language code. Other architectures may be used. Additionally, a computer program or its software components with such code may be embodied in more than one data processing system readable medium in more than one computer.

Figure 2:
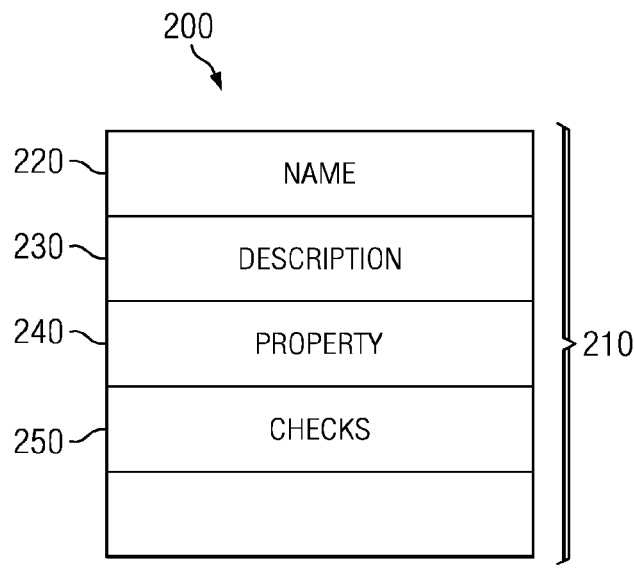
FIG. 2 includes a representation of a component.

Turning now to FIG. 2, a graphical representation of a component data structure is presented. Component 200 is a generic component which may be used to represent a logical or physical entity within an environment. Component 200 may have a set of fields 210 which contain information relating to the entity associated with component 200. Fields 210 may include a field for name 220, description 230, properties 240 and checks 250. Various other fields 210 may be included to further define component 200. Name field 220 may be used to particularly associate component 220 with a specific physical or logical entity. Description field 230 may further identify component 200, associate component 200 with a particular entity, or allow component 200 to be associated with a particular component type (as explained below).

Property field 240 may be used to represent the attributes or characteristics of the physical or logical entity represented by component 200, or with which component 200 is associated.

Property field 240 may be associated with one or more properties, a property may consist of a property name which may be associated with a value. This value in turn may correspond to an attribute of the physical or logical entity represented by component 200. A property may be a string, Boolean, decimal number, date/time, or an enumerated type, which describes the category of values a particular property may have. In one embodiment, a property may in turn be a data structure which has a name, a description, and a value. This data structure may then be given values based on an attribute of the entity represented by component 200.

Component 200 may also be related to a set of checks 250. A check may be a piece of logic which performs operations based on a certain set of conditions. These operations may consist of checking on the status of certain relationships associated with the component 200 (as described below), checking the status of certain properties 240, and other operations which will be readily apparent. These pieces of logic may be configured to operate automatically at certain time intervals, or may be applied at any point according to a variety of different triggering conditions which will be apparent to one of ordinary skill in the art after reading this disclosure.

Referring briefly back to FIG. 1, component 200 may be used to represent any object in IT environment 100. To represent server computer 110, name field 220 may be set to "server1", description 230 may be set to "server computer", property field 240 may contain three properties "OSType", "RAM", and "FreeStorage", which may be assigned the values corresponding to attributes 112 of server computer 110, "Solaris", "8 MB" and "6 MB" respectively.

Similarly, component 200 may represent database server 120; name field 220 may be set to "DB1", description 230 may be set to "database server application", property field 240 may contain three properties "OSType", "Footprint", and "Listen Port", which may be assigned the values corresponding to attributes 122 of database server 120, "Solaris", "12 MB" and "2100" respectively. As can be seen, component 200 may represent any entity, whether logical or physical equally well.

Figure 3:
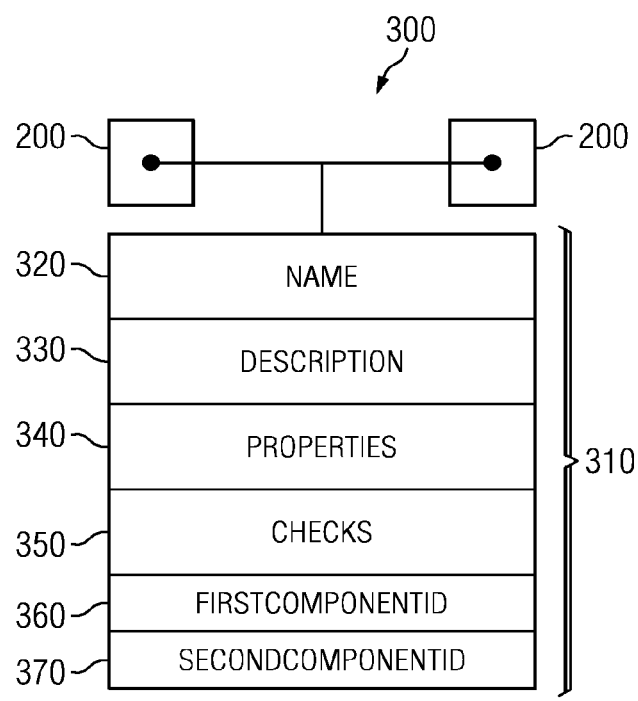
FIG. 3 includes a representation of a relationship.

Turning now to FIG. 3, a graphic representation of a relationship is depicted. Relationship 300 may be used to represent an association or dependency between two or more components 200. Relationship 300 may have a set of fields 310 which contain information pertinent to an association or dependency between two components. Fields 310 may include a field for name 320, description 330, property 340, and checks 350 as described above with respect to component 200. Name field 320 may be used to particularly associate relationship 300 with two or more physical or logical entities. In one embodiment, the name associated with name field 320 may be built programmatically based on the relationship type name and the names of the two components it is connecting. So, a "runs on" relationship type exists between components "app1" and "server1", the relationship name may be built automatically as "app1 runs on server1". That way, if either of the components' names changes, the relationship name may automatically changes to reflect this. Description field 230 may further distinguish relationship 300, associate relationship 300 with components, or allow relationship 300 to be associated with a particular relationship type (as explained below). Property field 340 may allow attributes of the relationships, dependencies between the relationships, or associations between the relationships, to be represented by a name and value pair. Checks 350 may contain one or more pieces of logic which perform operations based on certain set of conditions, as described above with respect to relationship 300. In a particular embodiment, fields 310 include fields 360, 370 to identify components 200 to which relationship 300 corresponds. Various other fields 310 may be included to further define relationship 300. In one embodiment, a relationship may have cardinality, such that a relationship may only represent an association or dependency between particular types or particular number of components. In other embodiments, a relationship may have directionality such that the relationship represents only that one component depends on another, and not vice versa. For example, a "runs on" relationship may have flags which can be used to indicate that a component "application1" runs on a component of type "server", but the component "server" does not run on the component "application1".

Returning for a moment to FIG. 1, relationship 300 may be used to represent any association between the logical or physical entities in IT environment 100. Component 200 may be used to represent database server 120 and server computer 110, as described above. Continuing with the above example, relationship 300 may be used to represent that database server 120 executes on server computer 110. Description 330 may be set to "runs on", property field 340 may contain a property "StartDate" which may be assigned the values corresponding to the date on which database server 120 began executing on server computer 110. To identify the components associated by relationship 300, FirstComponentID field 360 may be set to a name corresponding to server computer 110, in this example "server1"; likewise, SecondComponentID field 370 may be associated with component 200 representing database server 120. In one embodiment, row ids in a table are used to associate components with a relationship, thus, if a component is renamed relationships referencing this component do not have to be altered. As can be seen, relationship 300 may represent any association or dependency between any two or more logical or physical entities equally well.

However, as can be readily imagined, instantiation and definition of components and relationships for a complex environment may be a manually intensive process. To alleviate these concerns, in one embodiment, a typing system is included to allow the ability to define a hierarchy of component and relationship types which may serve as templates to instantiate components or relationships of these different types.

Figure 4:
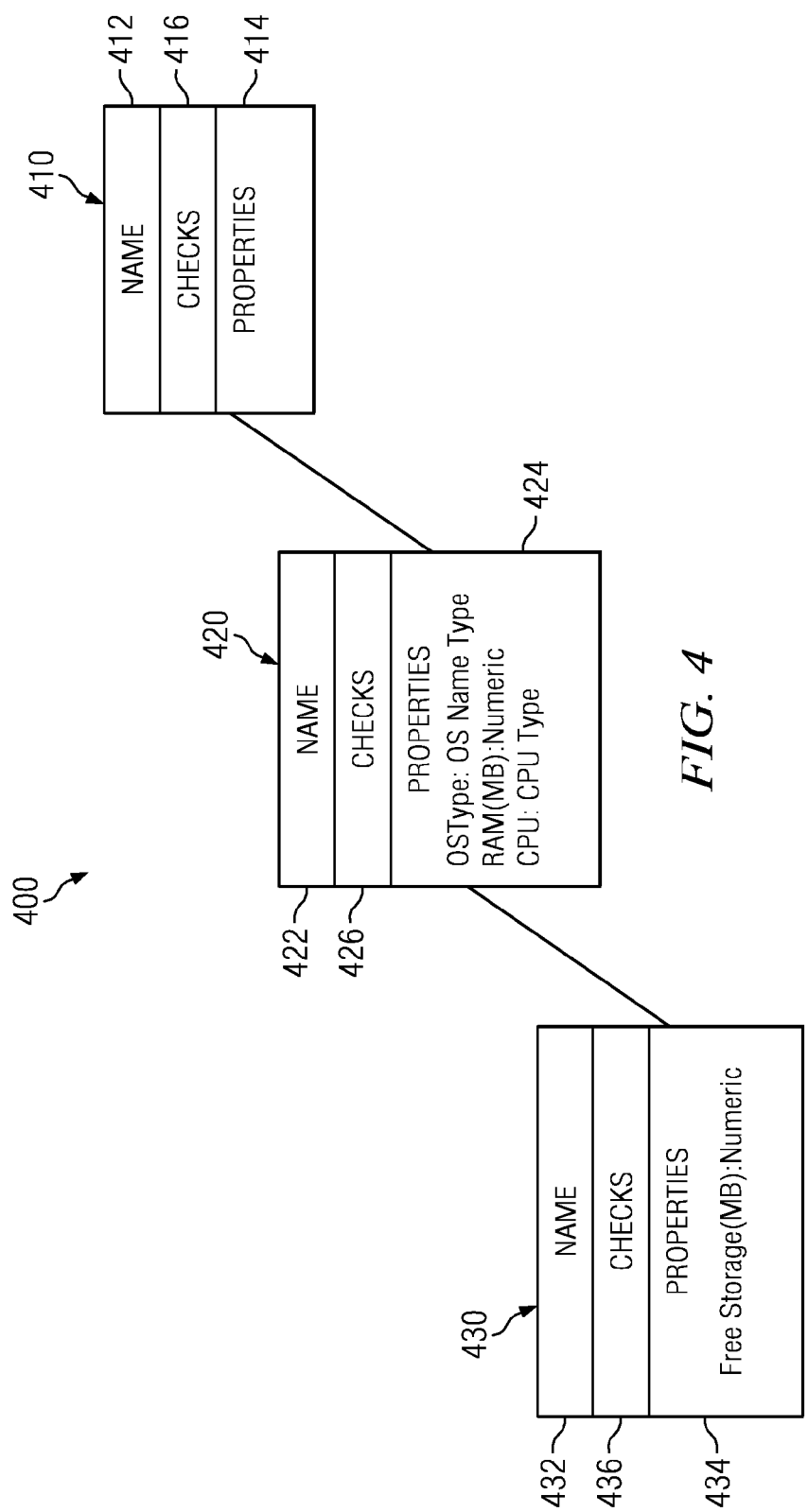
FIG. 4 includes a representation of a hierarchy of component types.

A hierarchy 400 of component types 410, 420, 430 is depicted in FIG. 4. Types 410, 420, 430 may provide different templates for instantiation of different components. Types, 420, 430 may have additional fields depending on the intended use of a component instantiated from the type. A component may be instantiated from a type and values assigned to the fields of the component based upon the physical or logical entity represented by the component.

Generic component type 410 may have a set of fields as described above. These fields may include a name and description 412, a set of properties 414, and a set of checks 416. A generic component may be instantiated from generic component type 410, and used to represent an atomic entity. For example, in order to represent server computer 110, a user may instantiate component 200 from generic component type 410, name component 200, define the list of properties pertinent to server computer 110, give these properties values based on the attributes of server computer 110, define checks pertinent to server computer 110, etc. In this manner, component 200 can be created which represents server 110 accurately. However, representing a complex environment in this manner becomes labor intensive, as a component to represent each atomic entity within the environment may have to be created manually.

To remedy this problem, more specific component types may be defined which serve as templates to instantiate components which represent specific entities in an environment. For example, a computer component type 420 may be defined to serve as a template for components which represent computers. This computer component type 420 may contain properties 424 or checks 426 which are designed to represent a generic computer. A property within the set of properties 424 may contain a name and enumerated type corresponding to the values which that property may have. As expressed above, a property within the set of properties 424 may itself be a data structure; in this case a property may contain a name and a reference to a data structure. Examples of property names and their corresponding enumerated types are depicted in properties 424 of computer component type 420. Properties 424 and checks 426 will be common to all components instantiated from computer component type 420; in other words, all components instantiated from computer component type 420 will contain properties 424 and checks 426 of computer component type 420. This computer component type 420 may be used to instantiate component 200 to represent a computer in an environment, this component's 200 properties can then be assigned values based on the attributes of the computer which component 200 is intended to represent.

Figure 5:
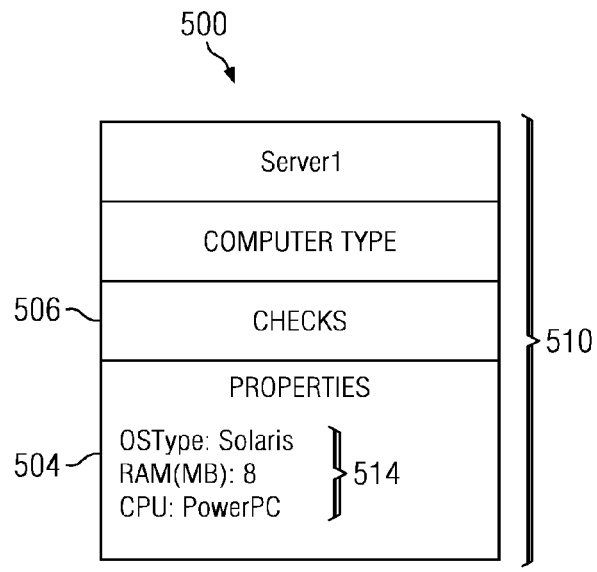
FIG. 5 includes a representation of a component instantiated from a component type.

FIG. 5 is a depiction of component 500 which has been instantiated from computer component type 420 to represent server computer 110. Component 500 has fields 510 corresponding to the fields defined by computer component type 420, including properties 504 and checks 506 contained in the type definition of computer component type 420. The values 514 of properties 504 of component 500 may correspond to characteristics or attributes 112 of server computer 110. If server computer 110 has 8 megabytes of RAM, the property named "RAM" of component 500 may be set to 8. If the operating system implemented on web server is Solaris, the value of the "OSType" property in component 500 may be Solaris, etc. In this manner, component 500 models server computer 110 by representing attributes 112 of server computer 110 with the properties 504 of component 500.

Returning now to FIG. 4, in many cases computers in an environment may perform a specialized function, such as server computer 110. To represent these specialized machines, it may be desirable to have additional properties in the components representing these specialized machines which are not present in computer component type 420. This discrepancy may be remedied manually; a component of type "computer" may be instantiated from computer component type 420 to represent server computer 110, and any specialized properties desired, but not contained, in this component may be added. Again, however, this process quickly becomes manually intensive when many specialized machines are present.

In some embodiments, a component subtype may be defined with respect to a parent component type. This component subtype represents a specialized subgroup of the respective parent component type. A component instantiated from a component subtype may inherit all the properties and checks corresponding to its respective parent component type.

Consequently, when component 200 is instantiated from a component subtype, component 200 contains all the properties and checks contained in the definition of the component subtype plus all the properties and checks contained in the definition of the parent component type.

For example, computer component type 420 may be defined to serve as a template for components which represent computers. This computer component type 420 will contain checks 426 or properties 424 which correspond to a generic computer, and will be common to all components instantiated from computer type 420. A server computer component subtype 430 may be defined with respect to parent computer component type 420. This definition may include only properties 434 and checks 436 specific to server computer component subtype 430. Consequently, when a component is instantiated from server computer component subtype 430 this component will contain all the properties 424, 434 and checks 426, 436 contained in both the parent computer component type 420 and the server computer component subtype 430. For example, if component 200 were instantiated from server computer component subtype 430, component 200 would contain the properties named "OSType", "RAM", and "CPU" contained in parent computer component type 420, and the property "FreeStorage" contained in server computer component subtype 430. These properties may then be assigned values.

It will be apparent to those of ordinary skill in the art the recursive nature of this type/subtype correlation and the inheritance characteristics that accompany these correlations. For example, a subtype may be the parent type of a second subtype. In addition to containing the checks and properties defined in the second subtype, a component instantiated from the second subtype will contain the checks and properties defined in both the first subtype and the original parent. The power and flexibility of such a system will also be apparent, a component hierarchy specifically tailored to any environment can be defined from a generic component type.

As described above, relationships are used in tandem with components to model arbitrary systems and environments by representing an association or dependencies between two components. As will be readily apparent, the same reasoning that applies to components with respect to a hierarchy of types may be applied equally well to relationships. Manual instantiation of relationships may be time consuming if the representation of many dependencies or associations is necessary. Consequently, types and subtypes corresponding to a particular category of these dependencies or associations may also be defined for relationships, and relationships instantiated from these defined types and subtypes. Each relationship type may also have cardinality, such that a relationship instantiated from this relationship type may only represent an association or dependency between two particular component types or subtypes. For example, a "runs on" relationship type may be defined to exist between one component of type "application" and one component of type "server". Additionally, as mentioned above a relationship type may have flags which can be used to indicate directionality, such that a relationship instantiated from this relationship type may only represent that one component depends on another component in some manner, but not the opposite. It will be noted that all principles described with respect to types and subtypes in the context of components are equally applicable to relationships, including the principle of inheritance.

Figure 6:
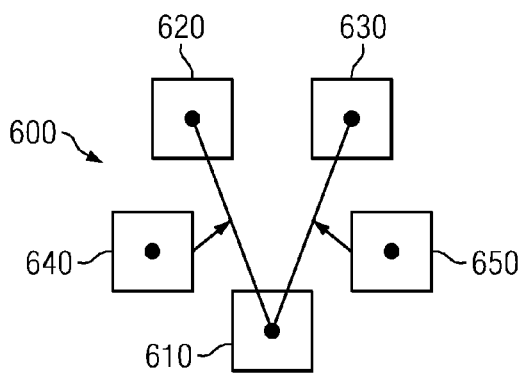
FIG. 6 includes a representation of an application of a data model to the IT environment of FIG. 1.

Moving on to FIG. 6, a representation 600 of using components and relationships to model a portion of IT environment in FIG. 1 is depicted. Component 610 represents the physical entity server computer 110 and has properties with values corresponding to attributes 112 of server computer 110. Components 620 and 630 represent logical entities database server 120 and web server 130 respectively. Properties of components 620, 630 may have values corresponding with attributes 122, 132 of database server 120 and web server 130.

Database server 120 executes on server computer 110. To represent this association, relationship 640 may be named "runs on", FirstComponentID field 360 of relationship 740 may be linked to component 620 representing database server 120, while SecondComponentID 370 may be linked with component 610 corresponding to server computer 110, and properties of relationship 640 may be defined accordingly. In this manner, the fact that database server 120 executes on server computer 110 may be modeled by relationship 640. Likewise, the fact that web server 130 also executes on server computer 110 may also be modeled. Relationship 650, also of type "runs on", may be instantiated, given properties, and associated with components 610, 630 representing web server 130 and server computer 110 using FirstComponentID field 360 and SecondComponentID field 370. This type of data model allows changes to an environment to be accommodated with a minimum of disturbance to the model of that environment. In particular embodiments, a blueprint may be used to contain the entire representation 600 of the IT environment.

Figure 7:
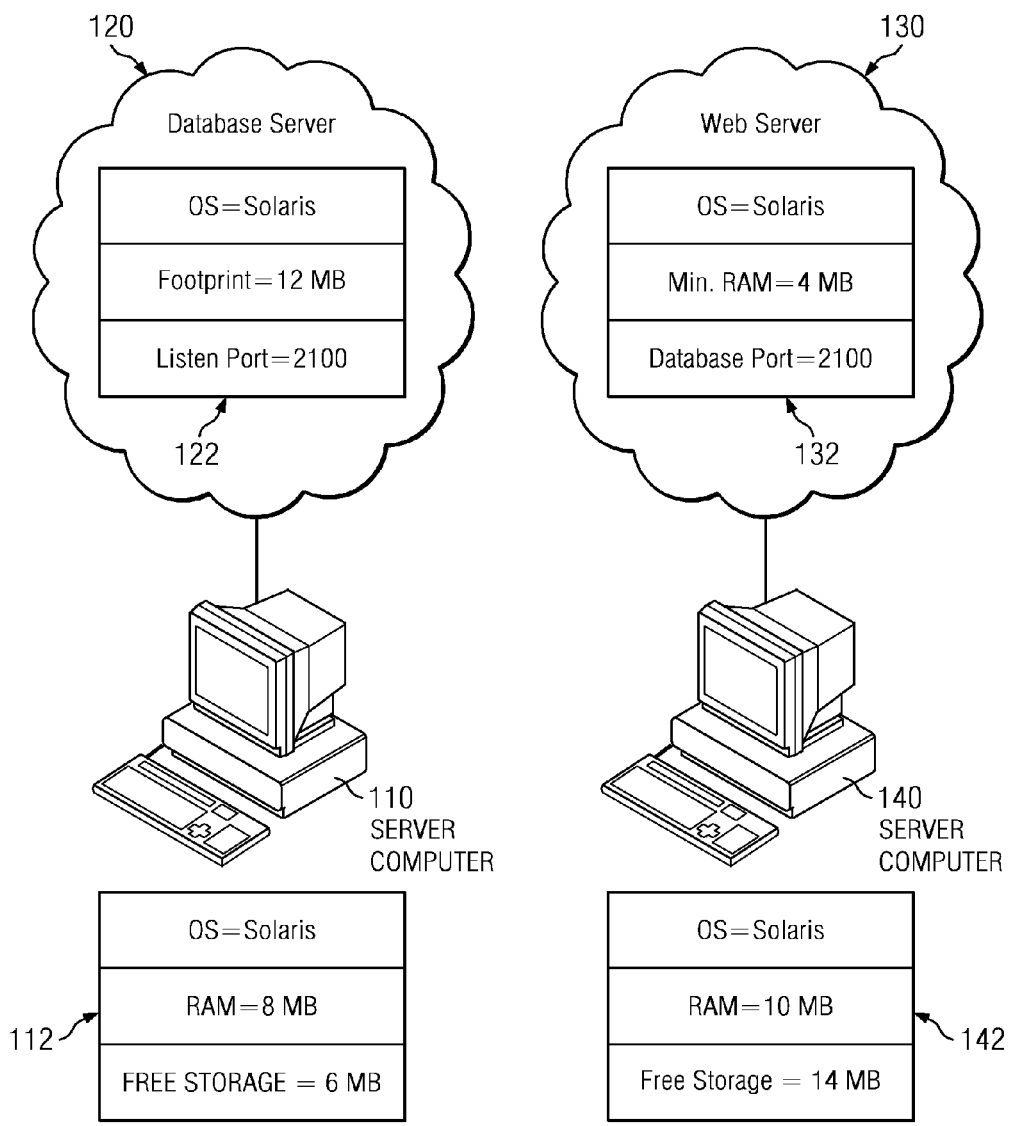
FIG. 7 includes an illustration of an alteration to the IT environment of FIG. 1.

Suppose that the IT environment depicted in FIG. 1 is altered to the IT environment depicted in FIG. 7. IT environment 100 now includes second server computer 140, with web server 130 executing on second server computer 140. Server computer 110, database server 120, and web server 130 remain unaltered, with exactly the same attributes 112, 122, 132. To represent the IT environment in FIG. 7 minimal changes to the model represented in FIG. 6 are necessary.

Figure 8:
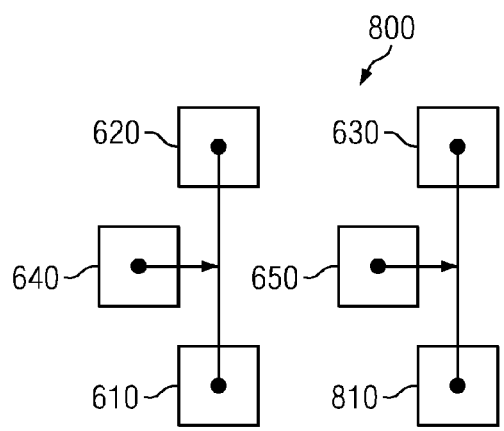
FIG. 8 includes a representation of an application of a data model to the IT environment of FIG. 7.

FIG. 8 is a representation 800 of an application of embodiments of the data model to the IT environment depicted in FIG. 7. Component 810, representing second server computer 140, has been added to the model. Properties of component 810 have values corresponding to attributes 142 of second server computer 140. Components 610, 620, 630 remain unaltered, as the entities which they represent remain unchanged. Relationship 640 also remains unaltered, as database server 120 still executes on server computer 110. Relationship 650, representing the association between web server 130 and the entity on which web server 130 executes, must be altered to accurately represent that web server 130 now executes on second server computer 140. This alteration may be accomplished simply by changing SecondComponentID field 370 of relationship 650 to an association with component 810 representing server computer 140. Relationship 650 now accurately depicts the association between web server 130 and second server computer 140. As can be seen, changes to a particular environment can be easily accommodated by the data model with a minimum of change to the actual data structures which represent the environment.

Often times after a particular enterprise architecture is modeled using components and relationships, the resulting data model is applied to the management and analysis of the enterprise architecture. One particularly useful application of the data model is determining the impact or level of dependency of a particular asset on other assets in the enterprise architecture represented by the data model, where determination of the dependency level between any two assets takes into account the level of dependencies of the intervening assets. Using the data model of the enterprise architecture, dependency chains for one or more components of the data model can be discovered and a dependency map created. Using impact ratings associated with relationships between components in the dependency chains of a particular component, the level of dependency between two individual components, or of a component aggregately on an environment, can be determined.

Figure 9:
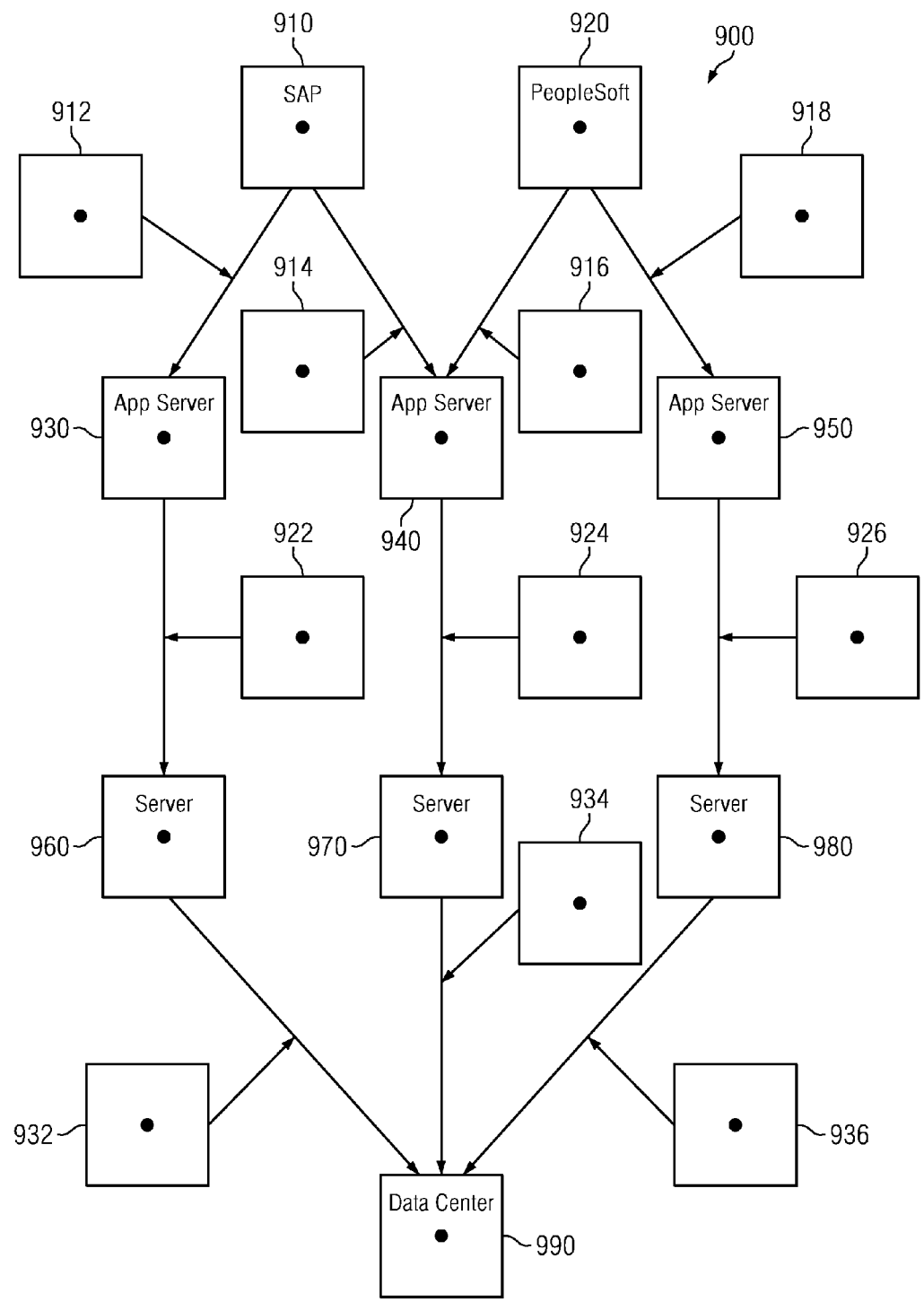
FIG. 9 includes a representation of a data model for an example enterprise architecture.

Another example may be helpful in describing the systems and methods of the present invention used to determine the impact of an asset within an enterprise architecture. Turning to FIG. 9, a representation 900 of an exemplary data model of an enterprise architecture which will be used in conjunction with various descriptions of the embodiments of the invention is depicted. Components 910 and 920 represent an SAP and a PeopleSoft database respectively. Components 930, 940 and 950 represent application server applications, components 960, 970 and 980 represent hardware servers and component 990 represents the physical location of a data center. Relationships 912-918 are directional "runs on" relationships (the direction of which is indicated by the arrow). Relationship 912 represents that the SAP database represented by component 910 executes on the application server represented by component 930. Similarly, relationship 914 represents that the SAP database represented by component 910 executes on the application server represented by component 940, relationship 916 represents that the PeopleSoft database represented by component 920 executes on the application server represented by component 940, and relationship 918 represents that the PeopleSoft database represented by component 910 executes on the application server represented by component 950.

Relationships 922-926 are also directional "runs on" relationships. Relationship 922 represents that the application server represented by component 930 executes on the hardware server represented by component 960. Similarly, relationship 924 represents that the application server represented by component 940 executes on the hardware server represented by component 970 and relationship 926 represents that the application server represented by component 950 executes on the hardware server represented by component 980.

Relationships 932-936 may be directional "located in" relationships, such that relationship 932 represents that the hardware server represented by component 960 is located in the data center represented by component 990; relationship 934 represents that the hardware server represented by component 970 is located in the data center represented by component 990 and relationship 936 represents that the hardware server represented by component 980 is located in the data center represented by component 990.

As can be seen from representation 900, the impact of most assets corresponding to components in a data model depends not only on the direct impact of the asset represented by that component, but also includes the impact that the asset has on the other assets which depend on it, either directly or indirectly. For example, the impact of the data center represented by component 990 on the enterprise architecture represented by data model 900 may encompass: the impact that the data center would have on servers represented by components 960, 970, 980. The servers, in turn, impact the application servers represented by components 930, 940 and 950 which themselves impact SAP and PeopleSoft databases represented by components 910 and 920. Thus, the total impact of the data center represented by component 990 on the enterprise architecture represented by data model 900 includes the impact of the data center represented by component 990 would have on servers represented by components 960, 970, 980, application servers represented by components 930, 940 and 950 and SAP and PeopleSoft databases represented by components 910 and 920.

The same logic can be applied to the impact that data center represented by component 990 would have on an individual component, such as PeopleSoft database represented by component 920. The impact that data center represented by component 990 would have on PeopleSoft database represented by component 920 may encompass: the impact that the data center would have on servers represented by components 970, 980. The servers, in turn, impact the application servers represented by components 940 and 950 which themselves impact PeopleSoft database represented by components 920. Thus, the total impact of the data center represented by component 990 on the PeopleSoft database represented by component 920 includes the impact the data center represented by component 990 would have on servers represented by components 970, 980, application servers represented by components 940 and 950 and PeopleSoft databases represented by component 920.

As can be imagined, the more complex the data model the more complicated it becomes to determine the impact of a component in the data model and commensurately the more complicated it becomes to analyze the impact of an asset in an enterprise architecture represented by a component in the data model. What is desired is a methodology for utilizing a data model to determine the impact of an asset of an enterprise architecture both on other assets and on the enterprise architecture as a whole, where the asset is represented as a component in the data model.

Figures 10, 12, 13A:
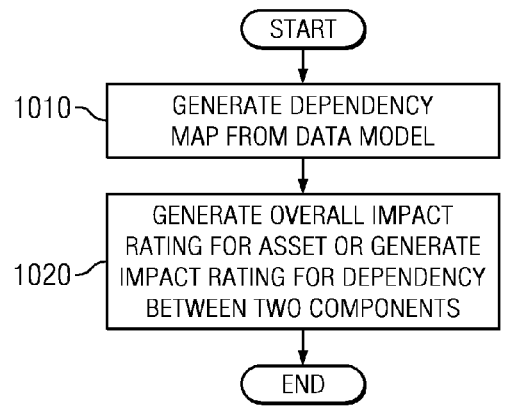

FIG. 10 presents one embodiment of just such a methodology. First, at step 1010, a dependency map may be generated from the data model. This dependency map may include dependency chains and impact ratings for these dependency chains, and may be utilized to generate an overall impact rating for a particular component of the data model, or an impact rating between two components, at step 1020.

Figure 11:
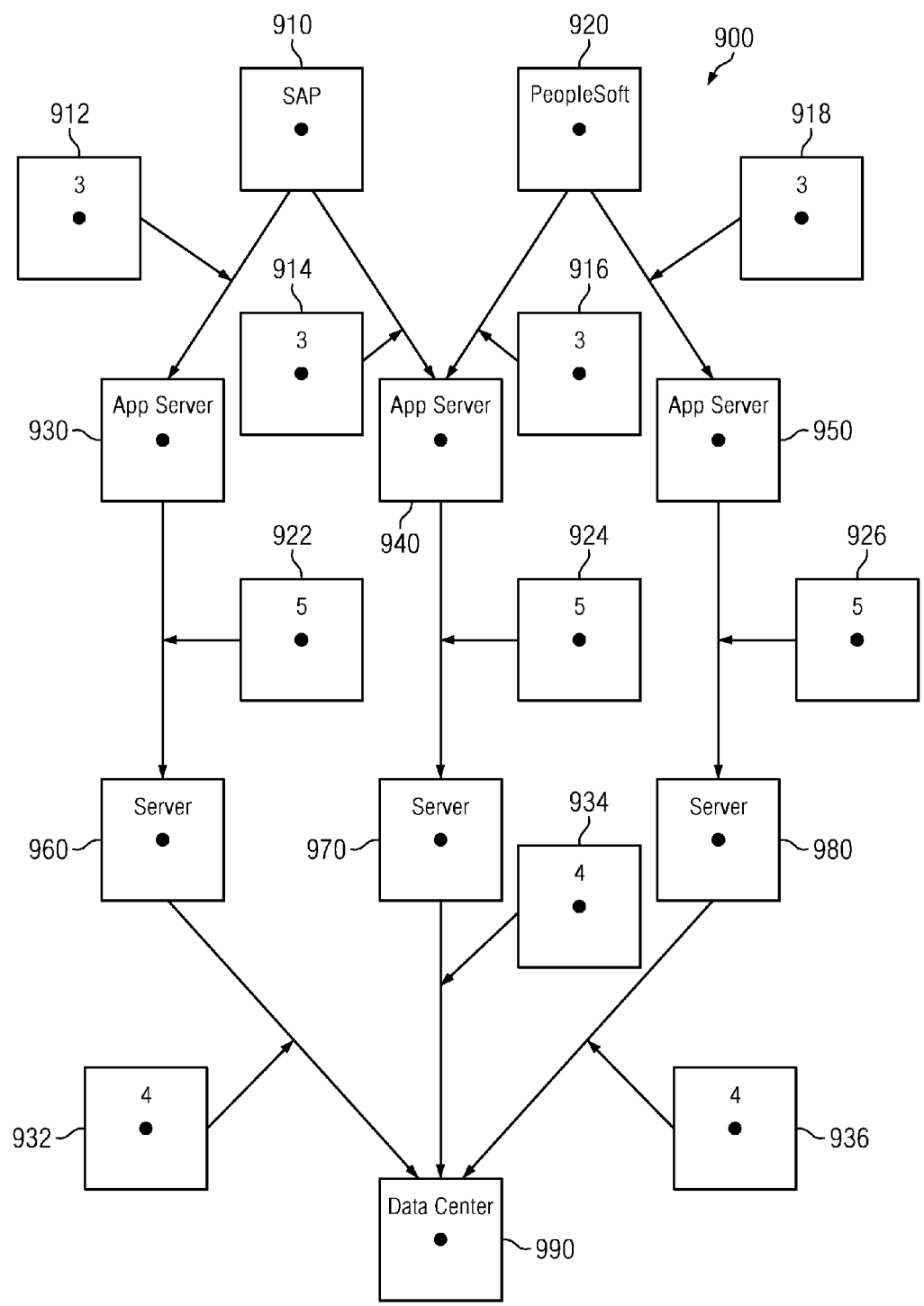
FIG. 11 includes a representation of a data model for an example enterprise architecture.

In one embodiment, the impact ratings for the dependency chains may be generated from the impact ratings of the relationships in the dependency chains. FIG. 11 depicts a representation of the data model of FIG. 9 with impact rating values assigned to the relationships. Notice that each relationship 912, 914, 916, 918, 922, 924, 926, 932, 934 and 936 may have a value associated with it. This value, which may be called an impact rating, indicates the level of impact one asset may have on another asset, as discussed above. For example, the impact rating associated with relationship 934 has a value of 4, which may be on a scale between the values of one and five and indicate that if the asset represented by component 990 was to be removed from the enterprise architecture this would mean (all other things being equal) that the function of the asset represented by data center component 990 may be replaced by a manual process. In other words, a value of one may indicate that the impact of the component on the dependent component is relatively small and five may indicate that the impact is relatively large. It will be apparent, however, that almost any impact scale may be utilized with equal efficacy. The value of the impact rating property of any relationship may be assigned or associated with the relationship at an earlier point, such as when the relationship is instantiated, based on a manual or automated analysis of the enterprise architecture being modeled.

This approach may sometimes be problematic, however, as enterprise architectures tend to be fluid entities. Thus, the data models that represent these enterprise architectures tend to be fluid as well. Occasionally, as a result of these changes the impact rating value originally associated with relationships may be reassigned at a later point, such as when additional assets are added to the enterprise architecture.

Based on the impact ratings assigned to these relationships, impact ratings may be assigned to the dependency chains of the data model. From the impact ratings assigned to the dependency chains the impact of any component on any other component, or the impact of any component on the enterprise architecture, may be calculated. In one particular embodiment, the determination of dependency chains and associated impact ratings may be determined by running a graph traversal algorithm on the data model. An example of such a graph traversal algorithm is depicted in Appendix A.

In one embodiment, the graph traversal algorithm may first generate a set of tables, with the tables indicating the dependencies for each component in a data model which does not itself depend on any other components. To determine these terminal first level dependencies for a component the directionality of each relationship associated with the component is evaluated to determine if the component is dependent on another component. If the component is not dependent on any other component, each relationship of the component may be then be analyzed to determine if the relationship indicates another component is dependent on the component. If the relationship indicates that another component is dependent on the component, the relationship may be further analyzed to see if it is an impact conferring relationship. This analysis may be accomplished by determining if the relationship has an impact rating property. If the relationship is an impact conferring relationship indicating that another component is dependent on this component this dependency may be indicated in the set of first level dependencies for that component, along with the value assigned to the "impact rating".

Again it is helpful to utilize the exemplary data model presented in FIG. 9 for illustration. For example, to determine the first level dependencies of component 990 each of relationships 932, 934 and 936 is evaluated to determine if these relationships 932, 934 and 936 indicate that component 990 is dependent on another component, whether another component is dependent on component 990, whether these relationships 932, 934 and 936 have an "impact rating" property, and what the value of the "impact rating" property is. In this case, as relationships 932, 934 and 936 are directional "runs on" relationships it will be indicated that the first level dependencies of component 990 are components 960, 970 and 980.

FIG. 12 depicts an example of a set of tables indicating the terminal first level dependencies of each component in the data model of FIG. 9 along with the exemplary impact ratings of FIG. 11. More specifically, as component 990 is the only component in data model 900 which itself does not depend on any other components, the set of terminal first level dependencies will encompass those components which depend on component 990. Table 1290 indicates the first level dependencies of component 990 and the impact rating associated with each first level dependency.

After the terminal first level dependencies and impact ratings for these dependency chains of the data model are determined, other dependency chains of the component in the data model may be determined. Returning to FIG. 12, the information of table 1290 of terminal first level dependencies may be used by the graph traversal algorithm to determine other dependency chains in the data model. In addition to determining other dependency chains, the graph traversal algorithm may also determine the impact rating associated with these dependency chains.

The graph traversal algorithm may then determine the remainder of the dependency chains of the data model (those other than the terminal first level dependencies). A first loop of the graph traversal algorithm may find all the set of dependency chains in the data model except for originating first level dependencies and terminal first level dependencies, and generate an impact rating for each of these dependency chains. An impact rating for a dependency chain may be determined by taking the lesser of the impact ratings of each of the relationships in the dependency chains. A second loop of the graph traversal algorithm may then determine the originating first degree dependencies of the data model and determine the impact rating for these dependency chains.

Turning to FIGS. 13A-D and 13E, one embodiment of the dependency chains generated respectively by the first and second loops of one embodiment of a graph traversal algorithm are depicted. FIGS. 13A-D depict the set of dependency chains in data model 900, depicted in FIG. 11, except for originating first level dependencies and terminal first level dependencies, as may be generated by the first loop of the graph traversal algorithm. FIG. 13E depicts the originating first degree dependencies of data model 900 of FIG. 11 and associated impact ratings for each of these dependency chains, as may be generated by the second loop.

Moving to FIGS. 14A-D, a representation of the dependency map determined by the graph traversal mechanism applied with respect to the data model of representation 900 and the impact ratings of the example depicted in FIG. 11 is illustrated. Each entry in tables 1401-1404 illustrates each of the dependency chains associated with data model 900, and the impact rating that should be attributed to that dependency chain when determining the impact of components on other component or on enterprise architecture. For example, row 1410 indicates that an impact rating of 3 should be assigned to the dependency chain consisting of component 920 (PeopleSoft database) which is dependent in the second degree on component 960 (server).

As mentioned above, however, modern enterprise architectures are complex systems. In fact, many assets of an enterprise architecture may be mutually dependent on one another. This may result in the data model representing an enterprise architecture of this type having a cycle.

Figure 15:
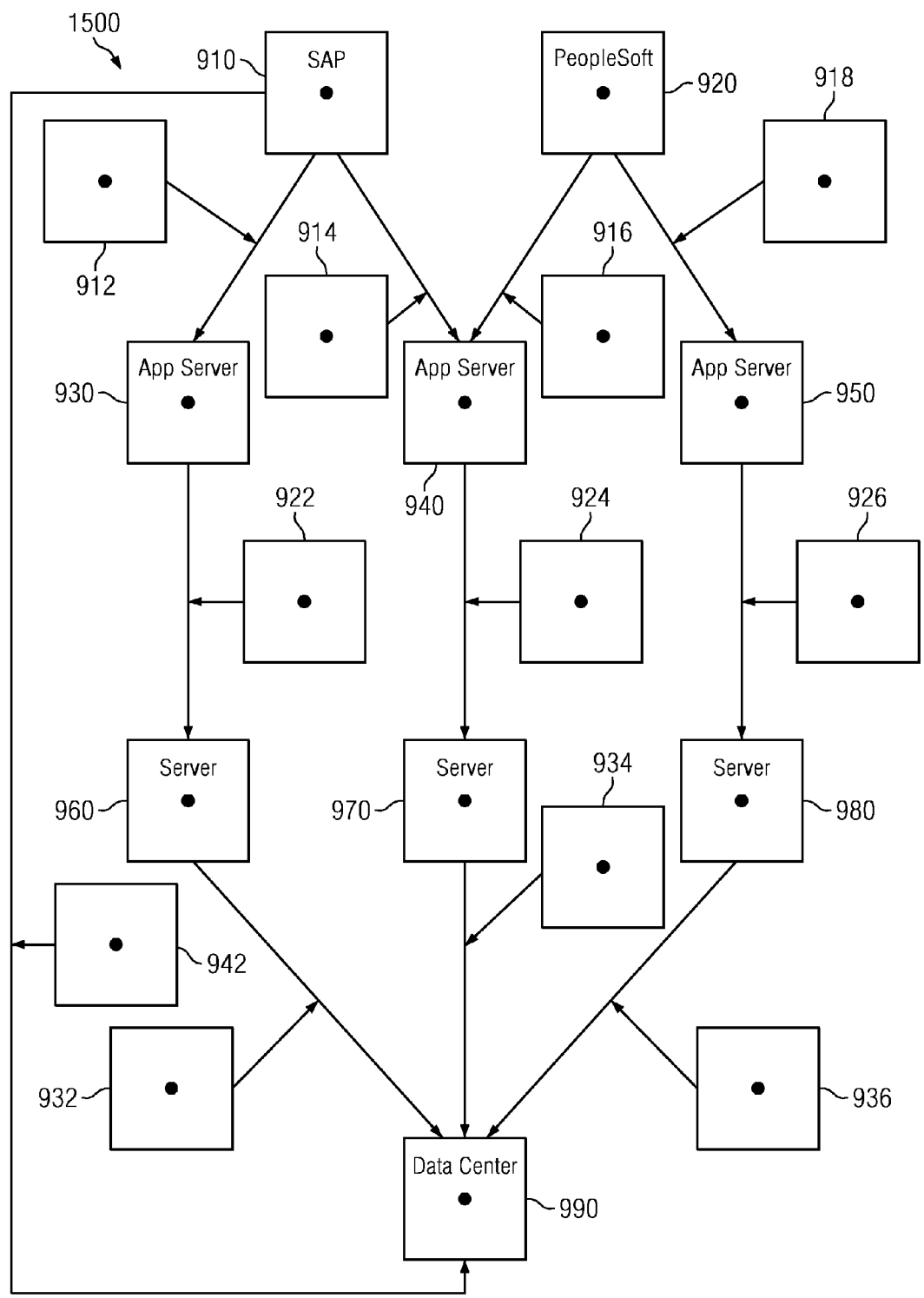
FIG. 15 includes a representation of a data model for an example enterprise architecture.

For example, turning to FIG. 15, suppose now that SAP data base represented by component 910 is located in the data center represented by component 990, as indicated by relationship 942. When executing the graph traversal algorithm described above on the data model depicted in representation 1500 to compute the impact of component 990, relationship 942 may create a cycle such that the graph traversal algorithm may enter a loop, or may determine the impact rating of various dependency chains more than once. In order to avoid these cycles and the potential loops or multiple counting of costs that these cycles may entail, in one embodiment the graph traversal algorithm may maintain a record of the components which have been visited during a traversal from a component, such that if a component is reached twice this may be accounted for, for example by ignoring that particular dependency chain.

Returning briefly to FIG. 10, once a dependency map and associated impact ratings have been generated at step 1010, this dependency map and associated impact ratings may be applied at step 1020 to generate an overall impact rating for an asset represented by a component, or may be applied to generate an impact rating for one component on another component.

FIG. 16 represents the results of the determination of an overall impact rating for component 970 using the dependency map generated for model 900, an embodiment of which is depicted in FIGS. 14A-D. For each dependency chain 1610 ending with component 970, the impact rating associated with that dependency chain 1610 can be summed to generate a total impact attributable to the asset represented by component 970. This total impact can then be divided by the number of dependency chains 1610 to generate an average impact rating which may be an overall or aggregate impact rating for component 970.

Turning now to FIG. 17, the results of one embodiment of a method for determining an impact rating between components is depicted. The example represented in FIG. 17 is of the determination of the impact rating between component 990 and component 920 using the dependency map generated for model 900 depicted in FIGS. 14A-D. For each dependency chain 1710 originating with component 920 and ending with component 970, the impact rating associated with that dependency chain 1610 can be determined. The lesser of each of these impact ratings can then be selected as the impact rating of the dependency between component 920 and component 990.

Similarly to the embodiments of the invention described above, other embodiments of the present invention may be utilized to determine the risk of an asset in an enterprise architecture in relation to the components on which it depends either directly or indirectly. This risk assessment may be performed by analyzing the dependency chains which originate with the component for which it is desired to determine the risk. The lowest impact rating of these dependency chains may be selected as the risk factor of the particular component.

Note that not all of the domains, components, component types, relationships, relationship types, properties, or property types are necessary, that domains, components, component types, relationships, relationship types, properties, or property types may be added in addition to those illustrated. Additionally, the order in which each of the activities is listed is not necessarily the order in which they are performed. After reading this specification, a person of ordinary skill in the art will be capable of determining which domains, components, component types, relationships, relationship types, properties, or property types and orderings best suit any particular objective. For example, domains such as time and finance may be added to the domains described above.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

APPENDIX A

This appendix presents one embodiment of a graph traversal algorithm for determining the dependencies of a data model. In this particular embodiment, this graph traversal algorithm may be used to determine the level of dependence of one component on another. The impact rating property on a relationship may describe the level of importance of the dependee component to the dependor component: the lower the impact rating, the less important the relationship. For example, an application that runs on 10 different servers might have a impact rating of 1 on each of those relationship, but a server that runs on a single server may have a rating of five.

One embodiment of the determination of the impact rating between two components or an overall impact rating may utilize two phases. In a first phase the embodiment of the graph traversal algorithm depicted develops a large table of dependency chains. In the second phase aggregates data from the main table to represent the impact rating between the two components or an overall impact rating.

Below is a pseudo-code depiction of the actions of one embodiment of a graph traversal algorithm for determining dependency chains of a data model.

01 Delete everything from IMPACT_PATH_TREE
02 Delete everything from MITIGATION_RATING
03 Populate MITIGATION_RATING from Mitigation Rating Enumeration
04 For all components c1 and c2 where c2 depends on c1 and c1 doesn't depend on anything

```
05 Insert into IMPACT_PATH_TREE
   PATH_ID=New Path ID
   PARENT_PATH_ID=null;
   START=c1
   END=c2
   DEPTH=1
   REL_MIT_RATING=Mitigation Rating from relationship
   PATH_MIT_RATING=Mitigation Rating from relation-
      ship
06 End
07
08 passcount=2
09 loop
10 For all components c1 and c2 where c2 depends on c1 and
   c1 is in
   IMPACT_PATH_TREE.END            where
      depth==passCount-1
11 Insert into IMPACT_PATH_TREE
   PATH_ID=New Path ID
   PARENT_PATH_ID=IMPACT_PATH_TREE.PATH_ID;
   START=IMPACT_PATH_TREE.START
   END=c2
   DEPTH=passCount
   REL_MIT_RATING=Mitigation Rating from relationship
   PATH_MIT_RATING=lesser of (Mitigation Rating from
      relationship and
   PATH_MIT_RATING   from   IMPACT_PATH_TREE
      where c1==END)
12 End
13 If no entries were created in last loop, exit
14 For all components c1 and c2 where c2 depends on c1 and
   c1 is in
   IMPACT_PATH_TREE.END            where
      depth==passCount-1
15 Insert into IMPACT_PATH_TREE
   PATH_ID=New Path ID
   PARENT_PATH_ID=null;
   START=c1
   END=c2
   DEPTH=1
   REL_MIT_RATING=Mitigation Rating from relationship
   PATH_MIT_RATING=Mitigation Rating from relation-
      ship
16 End
17 passCount=passCount+1
18 End
01 Clear the entire contents of the IMPACT_PATH_TREE
   table
02 Clear the entire contents of the MITIGATION_RATING
   table
03 Create an entry in MITIGATION_RATING for each entry
   in the enumeration type called Mitigation Rating
04 Find all components c1 and c2 where c1 is related to c2 and
   c2 doesn't depend on any other component and the rela-
   tionship between c1 and c2 implies dependency from c2 to
   c1 and there is a Mitigation Rating on that relationship.
05 Create an entry in IMPACT_PATH_TREE where the col-
   umn PATH_ID is a newly generated identifier, PARENT_
   PATH_ID is null, START is set to the id of component c1,
   END is set to the id of component c2, DEPTH is set to 1,
   and both REL_MIT_RATING and PATH_MIT_RATING
   are set to the Mitigation Rating property value on the
   relationship between c1 and c2.
08 Create a variable called passcount and set its initial value
   to 2
09 Begin a loop that will not end until we explicity exit from
   it
10 Find all components c1 and c2 where c1 is related to c2 and
   the relationship between c1 and c2 implies dependency
   from c2 to c1 and there is a Mitigation Rating on that
   relationship and there is an entry in IMPACT_PATH_
   TREE called ipt1 where ipt1.END=c1 and
   ipt1.DEPTH=passcount-1.
11 Create an entry in IMPACT_PATH_TREE where the col-
   umn PATH_ID is a newly generated identifier, PARENT_
   PATH_ID is ipt1.PATH_ID, START is set to the id of
   ipt1.START, END is set to the id of component c2, DEPTH
   is set to passCount-1, REL_MIT_RATING is set to the
   Mitigation Rating property value on the relationship
   between c1 and c2, and PATH_MIT_RATING is set to the
   lesser of the Mitigation Rating property value on the rela-
   tionship between c1 and c2 and
   ipt1.PATH_MIT_RATING.
13 If the previous insert statement did not create any new
   rows, we are done with the process and can exit from the
   loop.
14 Find all components c1 and c2 where c1 is related to c2 and
   the relationship between c1 and c2 implies dependency
   from c2 to c1 and there is a Mitigation Rating on that
   relationship and there is an entry in IMPACT_PATH_
   TREE called ipt1 where ipt1.END=c1 and
   ipt1.DEPTH=passCount-1.
15 Create an entry in IMPACT_PATH_TREE where the col-
   umn PATH_ID is a newly generated identifier, PARENT_
   PATH_ID is null, START is set to the id of component c1,
   END is set to the id of component c2, DEPTH is set to 1,
   and both REL_MIT_RATING and PATH_MIT_RATING
   are set to the Mitigation Rating property value on the
   relationship between c1 and c2.
17 Increment the passCount for the next iteration of this loop.
18 If any rows were created in the step on lines 10-12, go back
   line 10 and continue executing.
```

What is claimed is:

1. A computerized method for determining an impact between two or more assets, comprising:
providing a system comprising:
a modeling computer comprising a computer-readable memory and a modeling module, wherein assets in an environment are represented by components in a data model in the modeling module, wherein each component in the data model is an instantiation of a component type stored in a reference model in the computer-readable memory, wherein associations between assets are represented by relationships in the data model in the modeling module, wherein each relationship is an instantiation of a relationship type stored in the reference model computer-readable memory (70) (53); and
an impact analyzing computer comprising a computer-readable memory and an impact analyzing module;
determining a beginning component in the data model for which an impact is to be determined;
identifying the component type in the reference model corresponding to the beginning component;
determining a target component type, wherein the target component type and the beginning component type are linked by one or more relationship types (74);
traversing, using a graph traversal algorithm, the set of component types and relationship types stored in the reference model to identify all target component types and intervening target component types that have either a direct relationship or an indirect relationship with the beginning component type;
for each set of target component types and intervening target component types that has either a direct relationship or an indirect relationship with the beginning component type, analyzing the set of instantiated components and relationships in the data model to identify all chains of components containing the beginning component, the components of the target type, and any intervening components; and generating a dependency map having a set of dependency chains, wherein each dependency chain identifies the beginning component, all components of the target component type, and all intervening components of a component type that are linked to the beginning component.

2. The method of claim 1, wherein one or more relationships are directional relationships.

3. The method of claim 2, wherein identifying all chains of components that are linked between the beginning component to components of the target type comprises identifying component types that depend on the beginning component type.

4. The method of claim 2, wherein identifying all chains of components that are linked between the beginning component to components of the target type comprises identifying component types that depend from the beginning component type.

5. The method of claim 1, further comprising:
traversing, by the impact analyzing computer, the set of component types and relationship types to determine a target component type, wherein the target component type and the beginning component type are linked by one or more relationships.

6. The method of claim 1, further comprising:
receiving, by the impact analyzing computer, a target component type from a user, wherein the system is configured to determine all dependency chains between the starting component and components based on the target component type.

7. The method of claim 1, further comprising:
calculating a first impact rating for each dependency chain in the set of dependency chains; and
calculating a second impact rating of the starting component based on the first impact rating for each dependency chain in the set of dependency chains.

8. The method of claim 7, wherein if the dependency map includes two dependency chains having the same starting component and target component, selecting the lower of the first impact rating and the second impact rating as the impact rating of the dependency chain.

9. The method of claim 8, wherein executing the graph traversal algorithm may perform a first loop to determine the first level dependency chains except for originating first level dependencies and terminal first level dependencies and a second loop for determining the originating first level dependencies and terminal first level dependencies.

10. The method of claim 8, wherein calculating the impact rating for a dependency chain comprises:
determining an impact rating associated with each relationship in the set of relationships; and
selecting the lowest impact rating of the impact ratings of in the set of relationships.

11. The method of claim 8, wherein calculating the impact rating for a dependency chain comprises:
averaging the impact ratings of each of the relationships in the set of relationships.

12. A system for determining the impact of a first asset on a second asset, comprising:
a modeling computer comprising a first processor, a memory and computer-readable medium having code stored thereon for determining the impact of a first asset on a second asset, wherein the code is embodied within the computer readable medium, the code comprising instructions translatable for:

creating a reference model, wherein the reference model is composed of a logically structured taxonomy of component types, relationship types, cardinality constraints on relationships and property types;

creating a data model of an arbitrarily complex environment, wherein a component represents a logical or physical entity in the computing environment and wherein a relationship is a representation of a dependency between two or more components;

determining a beginning component in the data model for which an impact is to be determined;

identifying the component type in the reference model corresponding to the beginning component;

determining a target component type, wherein the target component type and the beginning component type are linked by one or more relationship types (74);

traversing, using a graph traversal algorithm, the set of component types and relationship types stored in the reference model to identify all target component types and intervening target component types that have either a direct relationship or an indirect relationship with the beginning component type;

for each set of target component types and intervening target component types that has either a direct relationship or an indirect relationship with the beginning component type, analyzing the set of instantiated components and relationships in the data model to identify all chains of components containing the beginning component, the components of the target type, and any intervening components; and generating a dependency map having a set of dependency chains, wherein each dependency chain identifies the beginning component, all components of the target component type, and all intervening components of a component type that are linked to the beginning component.

13. The computer readable storage medium of claim 12, wherein one or more relationships are directional relationships.

14. The computer readable medium of claim 13, wherein identifying all chains of components that are linked between the beginning component to components of the target type comprises identifying component types that depend on the beginning component type.

15. The computer readable medium of claim 13, wherein calculating the first impact rating for a dependency chain comprises:
identifying all chains of components that are linked between the beginning component to components of the target type comprises identifying component types that depend from the beginning component type.

16. The computer readable medium of claim 12, further comprising:
traversing, by the impact analyzing computer, the set of component types and relationship types to determine a target component type, wherein the target component type and the beginning component type are linked by one or more relationships.

17. The computer readable medium of claim 16, further comprising:
receiving, by the impact analyzing computer, a target component type from a user, wherein the system is configured to determine all dependency chains between the starting component and components based on the target component type.

18. A computer readable medium having code for determining the overall impact of an asset, wherein the code is embodied within computer readable medium, the code comprising instructions translatable for:

creating a reference model, wherein the reference model is composed of a logically structured taxonomy of component types, relationship types, cardinality constraints on relationships and property types;

creating a data model of an arbitrarily complex environment, wherein a component represents a logical or physical entity in the computing environment and wherein a relationship is a representation of a dependency between two or more components;

determining a beginning in the data model for which an impact is to be determined;

identifying the component type in the reference model corresponding to the beginning component;

determining a target component type, wherein the target component type and the beginning component type are linked by one or more relationship types (74):

traversing, using a graph traversal algorithm, the set of component types and relationship types stored in the reference model to identify all target component types and intervening target component types that have either a direct relationship or an indirect relationship with the beginning component type;

for each set of target component types and intervening target component types that has either a direct relationship or an indirect relationship with the beginning component type, analyzing the set of instantiated components and relationships in the data model to identify all chains of components containing the beginning component, the components of the target type, and any intervening components; and generating a dependency map having a set of dependency chains, wherein each dependency chain identifies the beginning component, all components of the target component type, and all intervening components of a component type that are linked to the beginning component.

19. The computer readable medium of claim 18, wherein one or more relationships are directional relationships.

20. The computer readable medium of claim 19, wherein creating a reference model and creating a data model comprises:

defining a plurality of types of data structures in the reference model, wherein each of the data structures comprises one or more fields or properties associated with the data structure, wherein all data structures of the same type contain the same properties;

instantiating a component for each asset in the environment, wherein each component has a set of fields which contain information relating to the asset associated with the component, wherein the set of fields comprises:

a set of property fields containing information about the attributes or characteristics of the component; and a field that contains a link to its component type in the reference model;

assigning values to the properties in the instantiated component based on the attributes of the asset which the component was instantiated to represent;

instantiating a relationship for representing an association or a dependency between two or more components, wherein each relationship comprises;

a field that is a foreign key to its relationship type; and a set of property fields containing information about one or more of the attributes of the relationship, wherein instantiating a relationship comprises assigning values to the properties in the component based on the attributes of the asset which the component was instantiated to represent; and storing the components in the data model, wherein property definitions of each component are linked to a type of component, wherein changes made to the type of component are automatically associated with all components of that type of component without changing the schema to reflect a corresponding change in the arbitrarily complex environment, wherein the schema is implemented in a database.

* * * * *